US011869443B2

(12) United States Patent
Park et al.

(10) Patent No.: US 11,869,443 B2
(45) Date of Patent: Jan. 9, 2024

(54) GATE DRIVER AND DISPLAY DEVICE INCLUDING THE SAME

(71) Applicant: SAMSUNG DISPLAY CO., LTD., Yongin-si (KR)

(72) Inventors: Jun Hyun Park, Yongin-si (KR); Dong Woo Kim, Yongin-si (KR); An Su Lee, Yongin-si (KR); Kang Moon Jo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/049,274

(22) Filed: Oct. 24, 2022

(65) Prior Publication Data

US 2023/0085547 A1 Mar. 16, 2023

Related U.S. Application Data

(63) Continuation of application No. 17/182,000, filed on Feb. 22, 2021, now Pat. No. 11,482,177, which is a continuation of application No. 16/697,022, filed on Nov. 26, 2019, now Pat. No. 10,930,220.

(30) Foreign Application Priority Data

Apr. 10, 2019 (KR) ........................ 10-2019-0042093

(51) Int. Cl.
*G09G 3/3266* (2016.01)

(52) U.S. Cl.
CPC ....... *G09G 3/3266* (2013.01); *G09G 2310/08* (2013.01)

(58) Field of Classification Search
CPC ............... G09G 3/3266; G09G 3/3233; G09G 2300/0426; G09G 2300/0842; G09G 2310/08; G09G 2310/061; G09G 2320/0223; G09G 2320/0295; G09G 2320/04; G09G 2330/021
See application file for complete search history.

(56) References Cited

U.S. PATENT DOCUMENTS 9,779,665 B2 10/2017 Song et al.
10,236,330 B2 3/2019 Maruyama
2011/0279436 A1 11/2011 Komiya et al.
(Continued)

FOREIGN PATENT DOCUMENTS

JP 2017-173505 A 9/2017
KR 10-2006-0009749 A 2/2006
KR 10-2016-0099750 A 8/2016

*Primary Examiner* — Brent D Castiaux
(74) *Attorney, Agent, or Firm* — Lewis Roca Rothgerber Christie LLP

(57) ABSTRACT

There are provided a gate driver and a display device including the same. The gate driver includes: a first scan driver; a first sensing driver; a first scan clock line; and a first sensing clock line. The first scan clock line includes a first scan clock main line extending in one direction, and a first scan clock connection line connected to the first scan clock main line and the first scan driver. The first sensing clock line includes a first sensing clock main line extending in one direction, and a first sensing clock connection line connected to the first sensing clock main line and the first sensing driver. The first scan clock main line is closer to each of the first scan driver and the first sensing driver than the first sensing clock main line.

19 Claims, 9 Drawing Sheets

(56) References Cited

U.S. PATENT DOCUMENTS

| | | | | |
|---|---|---|---|---|
| 2015/0194109 | A1 | 7/2015 | Fujikawa | |
| 2016/0240144 | A1* | 8/2016 | Song .................... | G09G 3/3266 |
| 2017/0193922 | A1 | 7/2017 | Pyeon | |
| 2019/0392767 | A1* | 12/2019 | Kim ..................... | G09G 3/3266 |

* cited by examiner

GATE DRIVER AND DISPLAY DEVICE INCLUDING THE SAME

CROSS-REFERENCE TO RELATED APPLICATIONS

This application is a continuation of U.S. patent application Ser. No. 17/182,000, filed Feb. 22, 2021, which is a continuation of U.S. patent application Ser. No. 16/697,022, filed Nov. 26, 2019, now U.S. Pat. No. 10,930,220, which claims priority to and the benefit of Korean Patent Application No. 10-2019-0042093, filed Apr. 10, 2019, the entire content of all of which is incorporated herein by reference.

BACKGROUND

1. Field

The present disclosure generally relates to a gate driver and a display device including the same.

2. Related Art

With the development of multimedia, the importance of display devices is gradually increasing. Accordingly, various display devices such as liquid crystal display (LCD) devices and organic light emitting display (OLED) devices have been developed.

OLED display devices have an organic light emitting diode included in each pixel that may be degraded as time elapses, and accordingly, the luminance of each pixel may decrease over time. In order to compensate for the decrease in luminance due to the degradation of the organic light emitting diode, there has been developed a degradation sensing technique of applying a predetermined voltage to an organic light emitting diode and measuring a current flowing through the organic light emitting diode.

SUMMARY

Embodiments provide a gate driver configured to reduce a variation of a voltage stored in a storage capacitor as the output of a scan signal is pulled down more rapidly than the output of a sensing signal, and a display device including the gate driver.

In accordance with an aspect of the present disclosure, there is provided a gate driver including: a first scan driver configured to output a first scan signal in response to a first scan clock signal; a first sensing driver adjacent to the first scan driver, the first sensing driver being configured to output a first sensing signal in response to a first sensing clock signal; a first scan clock line configured to transfer the first scan clock signal to the first scan driver; and a first sensing clock line configured to transfer the first sensing clock signal to the first sensing driver, wherein the first scan clock line includes a first scan clock main line extending in one direction, the first scan clock main line being at one side of the first scan driver, and a first scan clock connection line connected to the first scan clock main line and the first scan driver, wherein the first sensing clock line includes a first sensing clock main line extending in one direction, the first sensing clock main line being at one side of the first sensing driver, and a first sensing clock connection line connected to the first sensing clock main line and the first sensing driver, wherein the first scan clock main line is closer to each of the first scan driver and the first sensing driver than the first sensing clock main line.

The first sensing clock connection line may include a first overlapping region in which at least a portion of the first sensing clock connection line overlaps with the first scan clock main line.

The first scan clock main line may have a width greater than that of the first sensing clock main line.

The first scan clock main line may have a resistance value smaller than that of the first sensing clock main line, and the first scan clock line may have a resistance value smaller than that of the first sensing clock line.

The first scan clock connection line may have a width greater than that of the first sensing clock connection line.

The first scan clock connection line may have a resistance value smaller than that of the first sensing clock connection line, and the first scan clock line may have a resistance value smaller than that of the first sensing clock line.

The first scan clock connection line may include: a first flat portion connected to the first scan clock main line; and a first bent portion connected to the first flat portion and the first scan driver. The first bent portion may have a width smaller than that of the first flat portion, and be formed in a zigzag shape.

The first sensing clock connection line may include: a second flat portion connected to the first sensing clock main line; and a second bent portion connected to the second flat portion and the first sensing driver. The second bent portion may have a width smaller than that of the second flat portion, and be formed in a zigzag shape.

The first bent portion may have a length smaller than that of the second bent portion, and the first scan clock connection line may have a resistance value smaller than that of the first sensing clock connection line.

The first bent portion may have a length greater than that of the second bent portion, and the first scan clock connection line may have a resistance value substantially equal to that of the first sensing clock connection line.

The gate driver may further include: a second scan driver configured to output a second scan signal in response to a second scan clock signal; a second sensing driver configured to output a second sensing signal in response to a second sensing clock signal; a second scan clock line configured to transfer the second scan clock signal to the second scan driver; and a second sensing clock line configured to transfer the second sensing clock signal to the second sensing driver. The second scan clock line may include a second scan clock main line extending along one direction and a second scan clock connection line connected to the second scan clock main line and the second scan driver. The second sensing clock line may include a second sensing clock main line extending along one direction and a second sensing clock connection line connected to the second sensing clock main line and the second sensing driver. The second sensing clock connection line may include a second overlapping region in which at least a portion of the second sensing clock connection line overlaps with the first scan clock main line and a third overlapping region in which at least a portion of the second sensing clock connection line overlaps with the second scan clock main line.

The first sensing clock connection line may include a fourth overlapping region in which at least a portion of the first sensing clock connection line overlaps with the second sensing clock main line.

In accordance with another aspect of the present disclosure, there is provided a display device including: a display panel including a plurality of pixels; and a gate driver configured to provide a scan signal and a sensing signal to the pixels, wherein the gate driver includes: a scan driver configured to output a scan signal in response to a scan clock signal; a sensing driver adjacent to the scan driver, the sensing driver being configured to output a sensing signal in response to a sensing clock signal; a scan clock line configured to transfer the scan clock signal to the scan driver; and a sensing clock line configured to transfer the sensing clock signal to the sensing driver, wherein the scan clock line includes a scan clock main line extending along one direction and a scan clock connection line connected to the scan clock main line and the scan driver, wherein the sensing clock line includes a sensing clock main line extending along one direction and a sensing clock connection line connected to the sensing clock main line and the sensing driver, wherein the scan clock main line is closer to the pixels than the sensing clock main line.

The display device may further include a timing controller configured to generate the scan clock signal, the sensing clock signal, and first image data and a data driver configured to generate a data signal, based on the first image data. The pixels may emit light with a luminance corresponding to the data signal.

The scan signal may include a scan pulse, and the scan pulse may include a first scan pulse that is configured to maintains a turn-on voltage level and a second scan pulse that is changed from the turn-on voltage level to a turn-off voltage level. The sensing signal may include a sensing pulse, and the sensing pulse may include a first sensing pulse that maintains the turn-on voltage level and a second sensing pulse that is changed from the turn-on voltage level to the turn-off voltage level.

The scan pulse may have a width smaller than that of the sensing pulse, and the scan signal may be changed to the turn-off voltage level more rapidly than the sensing signal.

The first scan pulse may have a width substantially equal to that of the first sensing pulse, and the second scan pulse may have a width smaller than that of the second sensing pulse.

The scan clock signal may include a scan clock pulse, and the sensing clock signal may include a sensing clock pulse. The scan clock pulse may have a width smaller than that of the sensing clock pulse.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
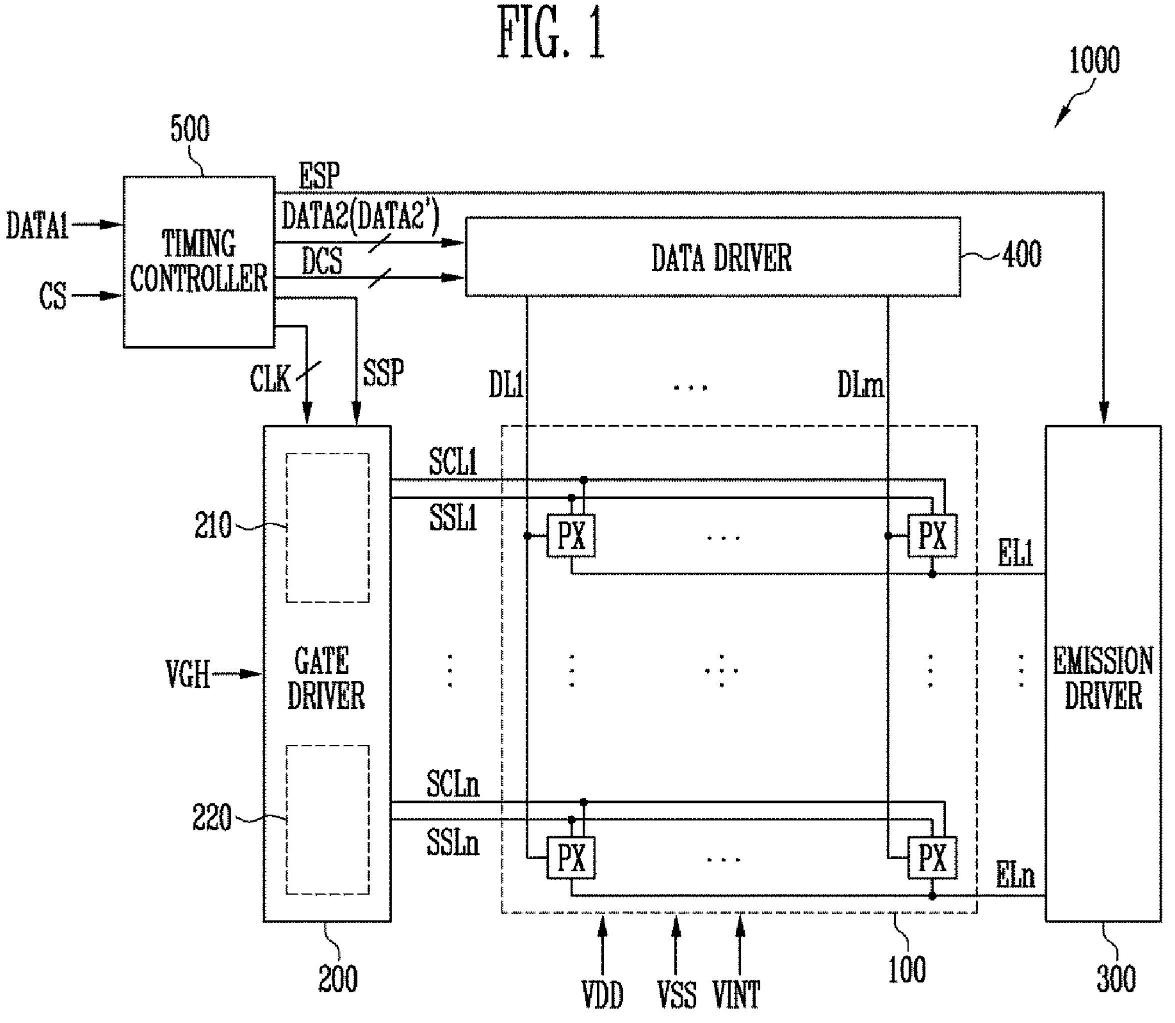
FIG. 1 is a block diagram schematically illustrating a display device in accordance with an embodiment of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The display device and/or any other relevant devices or components according to embodiments of the present invention described herein may be implemented utilizing any suitable hardware, firmware (e.g., an application-specific integrated circuit), software, or a combination of software, firmware, and hardware. For example, the display device may include a display panel, a gate driver, an emission driver, a data driver, and a timing controller. The gate driver may, for example, include at least one scan driver and at least one sensing driver. The various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram schematically illustrating a display device in accordance with an embodiment of the present disclosure.

Referring to FIG. 1, the display device 1000 may include a display panel 100, a gate driver 200, an emission driver 300, a data driver 400, and a timing controller 500.

The display panel 100 may include scan lines SCL1 to SCLn (n is a positive integer), sensing lines SSL1 to SSLn, emission control lines EL1 to ELn, data lines DL1 to DLm (m is a positive integer), and pixels PX. The pixels PX may be arranged in regions (e.g., pixel regions) defined by the scan lines SCL1 to SCLn, the sensing lines SSL1 to SSLn, the emission control lines EL1 to ELn, and the data lines DL1 to DLm.

The pixels PX may be arranged in a matrix form having a plurality rows and a plurality of columns on the display panel 100. Each of the pixels PX may be connected to at least one of the scan lines SCL1 to SCLn, at least one of the sensing lines SSL1 to SSLn, at least one of the emission control lines EU to ELn, and one of the data lines DL1 to DLm.

First and second power sources VDD and VSS may be provided to the display panel 100. The power sources VDD and VSS may be voltages necessary for the operation of the pixel PX, and the first power source VDD may have a voltage level higher than that of the second power source VSS. In some embodiments, an initialization power source VINT may also be provided to the display panel 100.

The gate driver 200 may receive a gate driving control signal (including a scan start signal SSP and a clock signal CLK) from the timing controller 500. The gate driver 200 may include a scan driver 210 and a sensing driver 220. In addition, a third power source VGH may be provided to the gate driver 200. The third power source VGH may be a voltage necessary for operations of the scan driver 210 and the sensing driver 220.

In a normal driving mode, the scan driver 210 of the gate driver 200 may generate a scan signal, and provide (e.g., sequentially provide) the scan signal to the scan lines SCL1 to SCLn. The scan driver 210 may include a shift register (or stage) configured to sequentially generate and output a pulse-type scan signal corresponding to a pulse-type start signal by using the clock signal CLK.

In a sensing mode, the sensing driver 220 of the gate driver 200 may generate a sensing signal, and sequentially provide the sensing signal to the sensing lines SSL1 to SSLn. The sensing driver 220 may include a shift register (or stage) configured to generate (e.g., sequentially generate) and output a pulse-type sensing signal corresponding to a pulse-type start signal by using the clock signal.

The pulse-type scan signal and the pulse-type sensing signal, which are generated in the gate driver 200, may be applied to each pixel PX. The scan signal provided from the scan driver 210 may be pulled down earlier than the sensing signal provided from the sensing driver 220. Further description of the configuration and operation of the gate driver 200 will be provided with reference to FIGS. 3 and 4A.

The emission driver 300 may receive an emission driving control signal from the timing controller 500. The emission driver 300 may generate an emission control signal in response to the emission driving control signal, and sequentially or concurrently (e.g., simultaneously) provide the emission control signal to the emission control lines EL1 to ELn. The emission driving control signal may include an emission start signal ESP, emission clock signals, and the like. The emission driver 300 may include a shift register configured to sequentially generate and output a pulse-type emission control signal corresponding to a pulse-type emission start signal by using the emission clock signals.

The data driver 400 may generate data signals, based on image data DATA2 and a data control signal DCS, which are provided from the timing controller 500, and provide the data signals to the display panel 100 (or the pixels PX). The data control signal DCS is a signal for controlling an operation of the data driver 400, and may include a load signal (or data enable signal) for instructing the output of a valid data signal, and the like. The pixels may receive a data signal through the data lines DL1 to DLm, and emit light with a luminance corresponding to the data signal.

The timing controller 500 may receive input image data DATA1 and a control signal CS from the outside (e.g., a graphic processor or graphics processing unit (GPU)), generate a scan control signal and a data control signal DCS based on the control signal CS, and generate image data DATA2 by converting the input image data DATA1. For example, the timing controller 500 may convert input image data DATA1 of an RGB format into image data DATA2 of an RGBG format, which corresponds to a pixel arrangement in the display panel 100.

According to an embodiment of the present disclosure, at least one of the gate driver 200, the emission driver 300, the data driver 400, and the timing controller 500 may be formed in the display panel 100, or be implemented with an Integrated Circuit (IC) to be connected to the display panel 100 in a tape carrier package form. In addition, at least two of the gate driver 200, the emission driver 300, the data driver 400, and the timing controller 500 may be implemented with a single IC.

Figure 2:
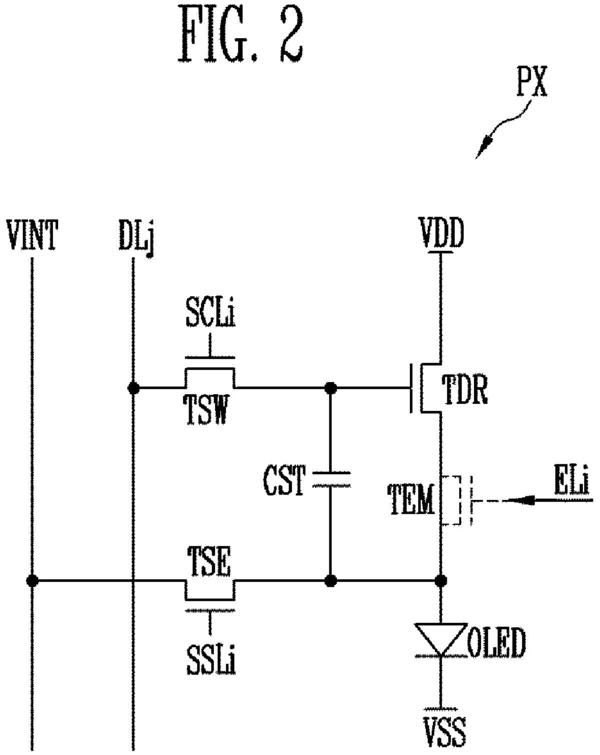
FIG. 2 is a circuit diagram illustrating an example of a pixel included in the display device shown in FIG. 1.

FIG. 2 is a circuit diagram illustrating an example of the pixel included in the display device shown in FIG. 1.

Referring to FIG. 2, the pixel PX may include a switching transistor TSW, a driving transistor TDR, a sensing transistor TSE, a storage capacitor CST, and a light emitting device OLED. A case where the pixel PX is a pixel disposed on a jth column (j is a natural number greater than 1) and an ith row (i is a natural number greater than 1) is described. In some embodiments, the pixel PX may further include an emission transistor TEM.

Although a case where the switching transistor TSW, the driving transistor TDR, the sensing transistor TSE, and the emission transistor TEM are implemented with an N-type transistor (e.g., an n-channel metal oxide semiconductor (NMOS) transistor) as is illustrated in FIG. 2, the present disclosure is not limited thereto. For example, at least one of the switching transistor TSW, the driving transistor TDR, the sensing transistor TSE, and the emission transistor TEM may be implemented with a P-type transistor.

The switching transistor TSW may transfer a data voltage to the pixel PX by a scan signal supplied to an ith scan line SCLi. One electrode of the switching transistor TSW may be electrically connected to the storage capacitor CST, and the transferred data voltage may be stored in the storage capacitor CST. The switching transistor TSW may be connected between a jth data line DLj and a gate electrode of the driving transistor TDR. A gate electrode of the switching transistor TSW may be connected to the ith scan line SCLi.

The driving transistor TDR may be electrically connected between a power line for transferring the first power source VDD and the light emitting device OLED. The gate electrode of the driving transistor TDR may be electrically connected to the storage capacitor CST. The driving transistor TDR may determine an amount of driving current flowing through the light emitting device OLED according to a magnitude of the data voltage (data signal) stored in the storage capacitor CST.

The sensing transistor TSE may transfer the initialization power source VINT to the pixel PX by a sensing signal supplied to an ith sensing line SSLi. The sensing transistor TSE may be coupled between a conductive line for transferring the initialization power source VINT and the light emitting device OLED. A gate electrode of the sensing transistor TSE may be connected to the ith sensing line SSLi.

When the pixel PX further includes the emission transistor TEM, the emission transistor TEM may be connected between the driving transistor TDR and the light emitting device OLED, and a gate electrode of the emission transistor TEM may be connected to an ith emission control line ELi. The emission transistor TEM may be selectively turned on in response to an emission signal.

Figure 3:
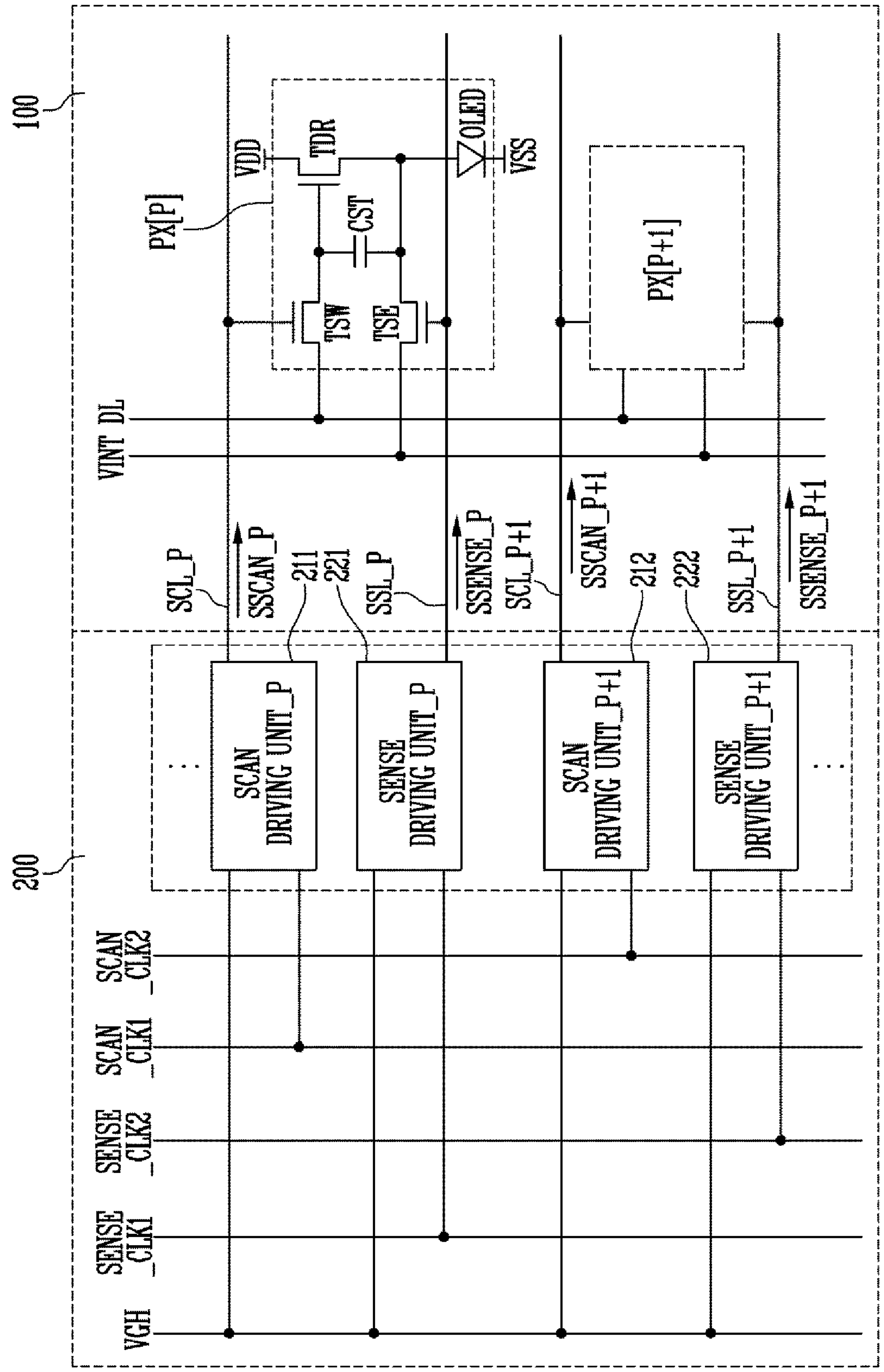
FIG. 3 is a diagram illustrating a gate driver and a display panel in accordance with an embodiment of the present disclosure.

FIG. 3 is a diagram illustrating a gate driver and a display panel in accordance with an embodiment of the present disclosure.

Referring to FIG. 3, a first pixel PX[P] and a second pixel PX[P+1] may be disposed on the display panel 100. The gate driver 200 formed at one side of the display panel 100 may include a first scan driver 211 and a first sensing driver 221, which are electrically connected to the first pixel PX[P], and a second scan driver 212 and a second sensing driver 222, which are electrically connected to the second pixel PX[P+1]. Also, the gate driver 200 may further include a power line for transferring a power signal to each of the scan drivers 211 and 212 and each of the sensing drivers 221 and 222 and clock lines for transferring a clock signal.

For convenience of description, the first pixel PX[P] and the second pixel PX[P+1] represent pixels disposed on a first column among a plurality of pixel columns, and the second pixel PX[P+1] represents a pixel disposed on a next pixel row relative to the first pixel PX[P].

The first scan driver 211 may receive a third power source VGH and a first scan clock signal SCAN_CLK1. The first scan driver 211 may generate a first scan signal SSCAN_P in response to the received signal. The first scan driver 211 may transfer the generated first scan signal SSCAN_P to the first pixel PX[P] through a first scan line SCL_P. The transferred first scan signal SSCAN_P may be applied to the switching transistor TSW of the first pixel PX[P]. The switching transistor TSW may be turned on according to the first scan signal SSCAN_P, and a data voltage may be transferred to the first pixel PX[P] through a data line DL.

The first sensing driver 221 may receive the third power source VGH and a first sensing clock signal SENSE_CLK1. The first sensing driver 221 may generate a first sensing signal SSENSE_P in response to the received signal. The first sensing driver 221 may transfer the generated first sensing signal SSENSE_P to the first pixel PX[P] through a first sensing line SSL_P. The transferred first sensing signal SSENSE_P may be applied to the sensing transistor TSE of the first pixel PX[P]. The sensing transistor TSE may be turned on according to the first sensing signal SSENSE_P, and transfer an initialization power source VINT to the first pixel PX[P].

The second scan driver 212 may receive the third power source VGH and a second scan clock signal SCAN_CLK2. The second scan driver 212 may generate a second scan signal SSCAN_P+1 in response to the received signal. The second scan driver 212 may transfer the generated second scan signal SSCAN_P+1 to the second pixel PX[P+1] through a second scan line SCL_P+1.

The second sensing driver 222 may receive the third power source VGH and a second sensing clock signal SENSE_CLK2. The second sensing driver 222 may generate a second sensing signal SSENSE_P+1 in response to the received signal. The second sensing driver 222 may transfer the generated second sensing signal SSENSE_P+1 to the second pixel PX[P+1] through a second sensing line SCL_P+1.

In an embodiment, a scan driver (e.g., the first scan driver) disposed on an odd-numbered row may receive the first scan clock signal SCAN_CLK1, and a sensing driver (e.g., the first sensing driver) disposed on the odd-numbered row may receive the first sensing clock signal SENSE_CLK1. In addition, a scan driver (e.g., the second scan driver) disposed on an even-numbered row may receive the second scan clock signal SCAN_CLK2, and a sensing driver (e.g., the second sensing driver) disposed on the even-numbered row may receive the second sensing clock signal SENSE_CLK2. However, the present disclosure is not limited thereto.

Although a case where one clock signal SCAN_CLK1, SCAN_CLK2, SENSE_CLK1, or SENSE_CLK2 is supplied to each of the scan and sensing drivers 211, 212, 221, and 222 is illustrated in FIG. 3, the number of clock signals supplied to each of the drivers 211, 212, 221, and 222 is not limited thereto. For example, two or more clock signals may be supplied according to the configuration of each of the drivers 211, 212, 221, and 222.

Figure 4A:
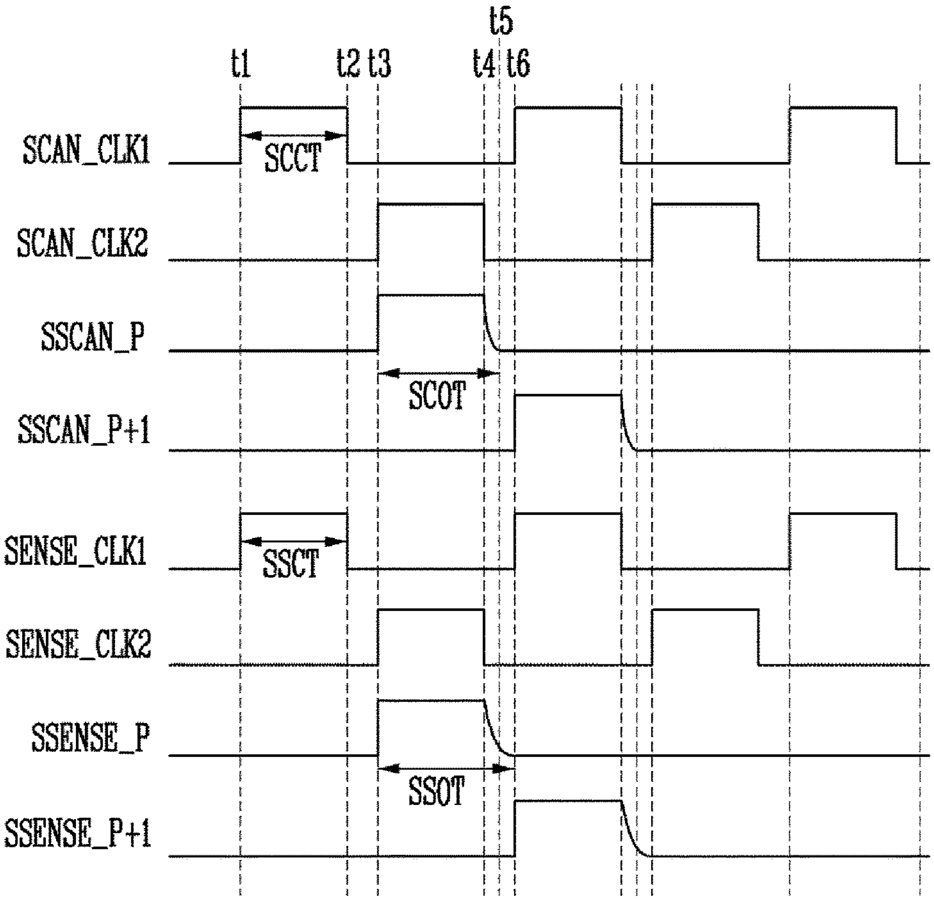
FIGS. 4A and 4B are timing diagrams illustrating an operation of the gate driver shown in FIG. 3.
Figure 4B:
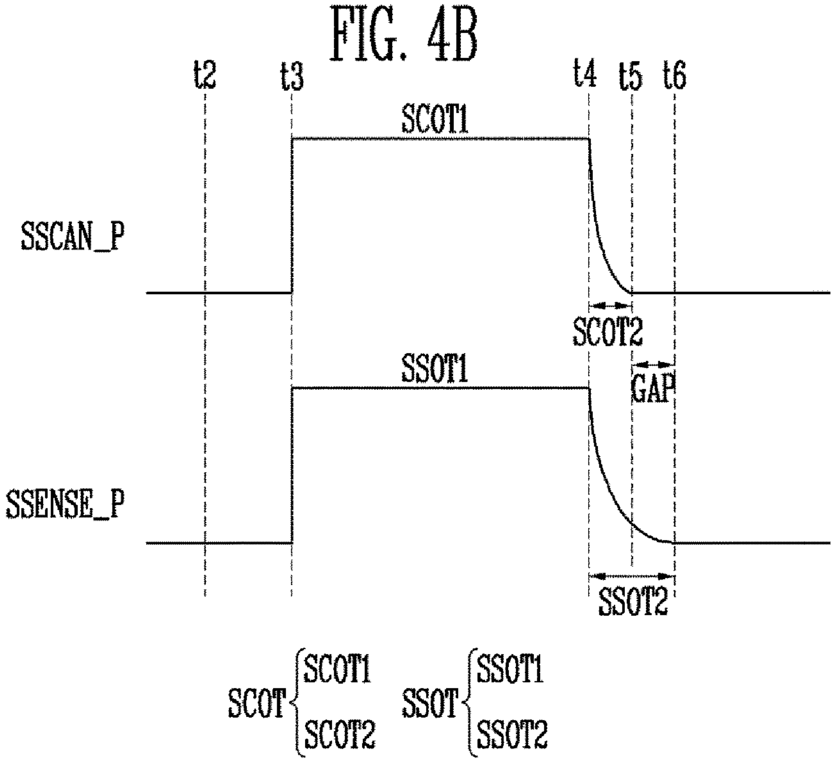

FIGS. 4A and 4B are timing diagrams illustrating an operation of the gate driver shown in FIG. 3.

Each signal which will be described below may have a turn-on voltage level and a turn-off voltage level. The turn-on voltage level may be a logic level that allows a transistor receiving a signal to be turned on. For example, when the transistor is an N-type transistor, the turn-on voltage level may be a logic high level. The turn-off voltage level may be a logic level that allows a transistor receiving a signal to be turned off. For example, the turn-off voltage level may be a logic low level. The turn-on voltage level and the turn-off voltage level may be differently set depending on a kind of transistor, a use environment of the display device, etc.

Referring to FIG. 4A in conjunction with FIG. 3, the first scan driver 211 may provide the first scan signal SSCAN_P to the first pixel PX[P] in response to the first scan clock signal SCAN_CLK1. The first sensing driver 221 may provide the first sensing signal SSENSE_P to the first pixel PX[P] in response to the first sensing clock signal SENSE_CLK1.

The first scan clock signal SCAN_CLK1 and the first sensing clock signal SENSE_CLK1 may be changed from the turn-off voltage level to the turn-on voltage level at a first time t1, and be changed from the turn-on voltage level to the turn-off voltage level at a second time t2. That is, between the first time t1 and the second time t2, the first scan clock signal SCAN_CLK1 and the first sensing clock signal SENSE_CLK1 may have a pulse of the turn-on voltage level. In an embodiment, a scan clock pulse SCCT of the first scan clock signal SCAN_CLK1 may have a width substantially equal to that of a sensing clock pulse SSCT of the first sensing clock signal SENSE_CLK1. However, in another embodiment, the width of the sensing clock pulse SSCT may be wider than that of the scan clock pulse SCCT.

At a third time t3, the first scan signal SSCAN_P and the first sensing signal SSENSE_P may be changed from the turn-off voltage level to the turn-on voltage level. The switching transistor TSW of the pixel PX[P] may receive the first scan signal SSCAN_P to be turned on. The switching transistor TSW may be turned on to transfer a data voltage of the data line DL to one end of the storage capacitor CST. The sensing transistor TSE of the pixel PX[P] may receive the first sensing signal SSENSE_P to be turned on. The sensing transistor TSE may be turned on to transfer an initialization voltage of the initialization power source VINT to the other end of the storage capacitor CST. That is, a driving voltage for driving the light emitting device OLED may be stored in the storage capacitor CST. The driving voltage may be a difference between the data voltage and the initialization voltage.

The first scan signal SSCAN_P may have a scan pulse SCOT of the turn-on voltage level according to the scan clock pulse SCCT of the first scan clock signal SCAN_CLK1. In addition, the first sensing signal SSENSE_P may have a sensing pulse SSOT of the turn-on voltage level according to the sensing clock pulse SSCT of the first sensing clock signal SENSE_CLK1.

FIG. 4B is an enlarged timing diagram illustrating the scan pulse SCOT of the first scan signal SSCAN_P and the sensing pulse SSOT of the first sensing signal SSENSE_P, which are shown in FIG. 4A.

Referring to FIG. 4B, the scan pulse SCOT of the first scan signal SSCAN_P may include a first scan pulse SCOT1 and a second scan pulse SCOT2, and the sensing pulse SSOT of the first sensing signal SSENSE_P may include a first sensing pulse SSOT1 and a second sensing pulse SSOT2.

As described above, at the third time t3 to a fourth time t4, the first scan signal SSCAN_P may have the first scan pulse SCOT1 of the turn-on voltage level, and the first sensing signal SSENSE_P may have the first sensing pulse SSOT1 of the turn-on voltage level.

From the fourth time t4, the first scan signal SSCAN_P and the first sensing signal SSENSE_P may be changed from the turn-on voltage level to the turn-off voltage level. For example, the first scan signal SSCAN_P may be pulled down from the turn-on voltage to the turn-off voltage from a fourth time t4 to a fifth time t5, and the first sensing signal SSENSE_P may be pulled down from the fourth time t4 to a sixth time t6. That is, the first scan signal SSCAN_P may have the turn-off voltage level at the fifth time t5, and the first sensing signal SSENSE_P may have the turn-off voltage level at the sixth time t6.

In other words, the first scan signal SSCAN_P may have the second scan pulse SCOT2 of the turn-on voltage level at the fourth time t4 to the fifth time t5, and the first sensing signal SSENSE_P may have the second sensing pulse SSOT2 of the turn-on voltage level at the fourth time t4 to the sixth time t6. The second scan pulse SCOT2 may have a width narrower than that of the second sensing pulse SSOT2. That is, the first scan signal SSCAN_P may be pulled down more rapidly than the first sensing signal SSENSE_P.

At the time t5 to the sixth time t6, the first scan signal SSCAN_P may have the turn-off voltage level, and the first sensing signal SSENSE_P may have the turn-on voltage level. When the first scan signal SSCAN_P and the first sensing signal SSENSE_P have the turn-off voltage level at the sixth time t6, the light emitting device OLED may emit light according to the driving voltage stored in the storage capacitor CST (e.g., the difference between the data voltage and the initialization voltage).

Unlike this embodiment, when the first scan signal SSCAN_P is changed later than the first sensing signal SSENSE, the switching transistor TSW of the pixel PX[P] may be turned off later than the sensing transistor TSE of the pixel PX[P], and accordingly, the driving voltage stored in the storage capacitor CST may be lost. For example, when the switching transistor TSW is turned off later than the sensing transistor TSE, the gate electrode of the driving transistor TDR does not trace a voltage variation at an anode electrode of the light emitting device OLED, and hence the driving voltage stored in the storage capacitor CST may be lost. Therefore, in this embodiment, the first scan signal SSCAN_P is to be changed to the turn-off level by being pulled down more rapidly than the first sensing signal SSENSE_P so as to prevent the loss of the driving voltage stored in the storage capacitor CST.

A gap GAP between the second scan pulse SCOT2 and the second sensing pulse SSOT2 may be determined according to delay times of the first scan signal SSCAN_P and the first sensing signal SSENSE_P, which will be described later. That is, when the delay time of the first sensing signal SSENSE_P is longer than that of the first scan signal SSCAN_P, the first scan signal SSCAN_P may be pulled down more rapidly than the first sensing signal SSENSE_P, and the gap GAP between the second scan pulse SCOT2 and the second sensing pulse SSOT2 may increase as the difference between the delay times increases.

The second scan signal SSCAN_P+1 is equal or similar to the first scan signal SSCAN_P, and the second sensing signal SSENSE_P+1 is equal or similar to the first sensing signal SSENSE_P. Hence, detailed descriptions of the second scan signal SSCAN_P+1 and the second sensing signal SSENSE_P+1 may be omitted.

Figure 5:
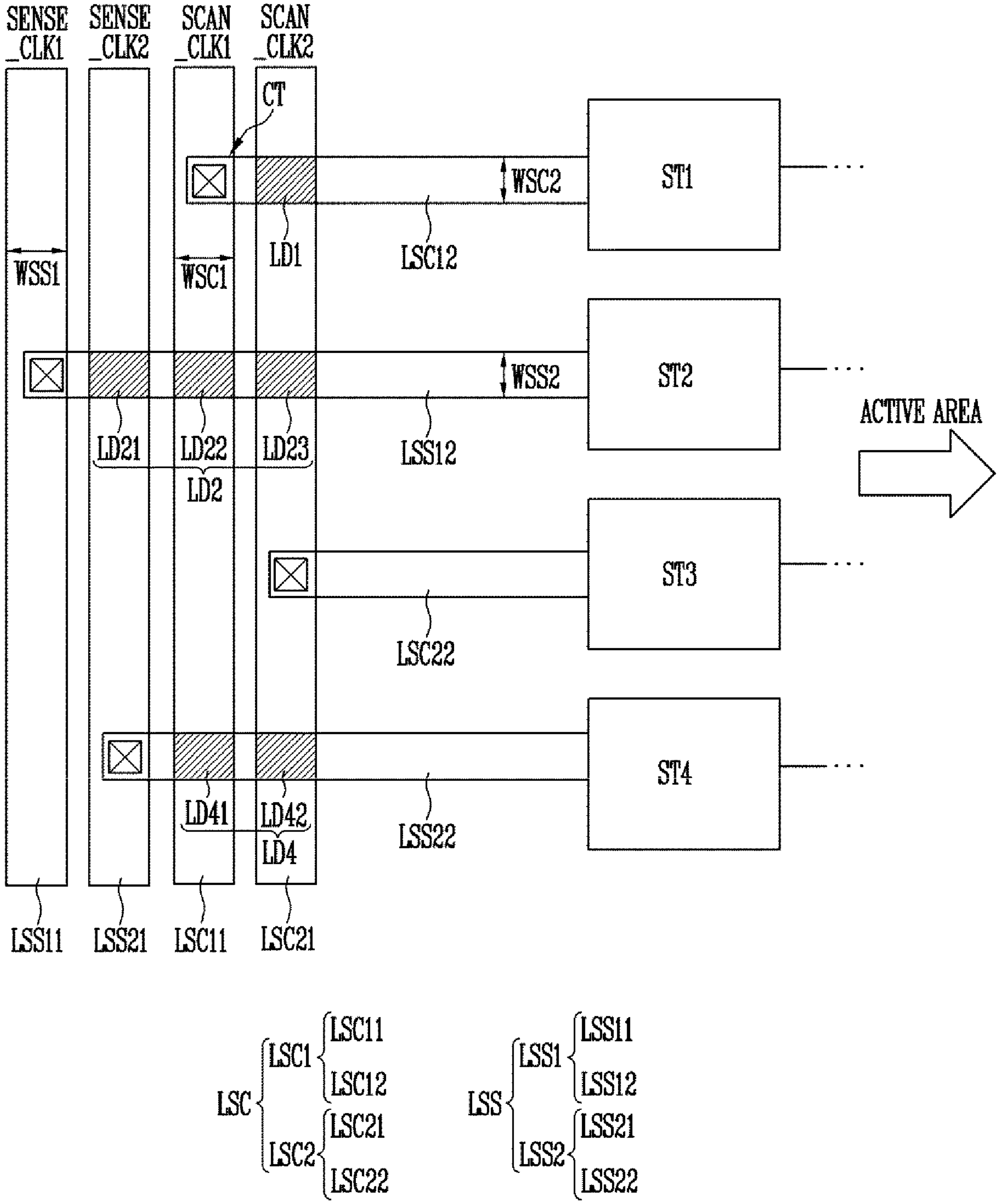
FIG. 5 is a view illustrating scan clock lines and sensing clock lines of the gate driver in accordance with an embodiment of the present disclosure.

FIG. 5 is a plan view illustrating scan clock lines and sensing clock lines of the gate driver in accordance with an embodiment of the present disclosure.

Referring to FIG. 5, the gate driver may include a plurality of stages ST1, ST2, ST3, and ST4, and a scan clock line LSC and a sensing clock line LSS, which are connected to the stages ST1, ST2, ST3, and ST4.

The scan clock line LSC may include a first scan clock line LSC1 and a second scan clock line LSC2. The first scan clock line LSC1 may include a first scan clock main line LSC11 and a first scan clock connection line LSC12 connected thereto. The second scan clock line LSC2 may include a second scan clock main line LSC21 and a second scan clock connection line LSC22 connected thereto.

The first scan clock line LSC1 may be connected to a first stage ST1, and the second scan clock line LSC2 may be connected to a third stage ST3. For example, the first stage ST1 may be the first scan driving unit (or the first scan driver) ("211" shown in FIG. 3), and the third stage ST3 may be the second driving unit (or the second driver) ("212" shown in FIG. 3). However, the present disclosure is not limited thereto, and each of the first stage ST1 and the third stage ST3 may further include other components such as a buffer unit (or a buffer).

The first stage ST1 and the third stage ST3 may receive scan clock signals from the first scan clock line LSC1 and the second scan clock line LSC2, respectively. The first stage ST1 may output a first scan signal in response to the scan clock signal, and the third stage ST3 may output a second scan signal in response to the scan clock signal. The output first and second scan signals may be transferred to pixels in a display area ACTIVE AREA.

The sensing clock line LSS may include a first sensing clock line LSS1 and a second sensing clock line LSS2. The first sensing clock line LSS1 may include a first sensing clock main line LSS11 and a first sensing clock connection line LSS12. The second sensing clock line LSS2 may include a second sensing clock main line LSS21 and a second sensing clock connection line LSS22.

The first sensing clock line LSS1 may be connected to a second stage ST2, and the second sensing clock line LSS2 may be connected to a fourth stage ST4. For example, the second stage ST2 may be the first sensing driver ("221" shown in FIG. 3), and the fourth stage ST4 may be the second sensing driver ("222" shown in FIG. 3). However, the present disclosure is not limited thereto, and each of the second stage ST2 and the fourth stage ST4 may further include other components such as a buffer unit.

The second stage ST2 and the fourth stage ST4 may receive sensing clock signals from the second sensing clock line LSS1 and the second sensing clock line LSS2, respectively. The second stage ST2 may output a first sensing signal in response to the sensing clock signal, and the fourth stage ST4 may output a second sensing signal in response to the sensing clock signal. The output first and second sensing signals may be transferred to the pixels in the display area ACTIVE AREA.

In an embodiment, the scan clock main lines LSC11 and LSC21 may have a width WSC1 equal to a width WSS2 of the sensing clock main lines LSS11 and LSS21, and the scan clock connection lines LSC12 and LSC22 may have a width WSC2 equal to a width WSS1 of the sensing clock connection lines LSS12 and LSS22.

Although not shown in the drawing, an insulating layer may be disposed between each of the clock main lines LSC11, LSC21, LSS11, and LSS21 and each of the clock connection lines LSC12, LSC22, LSS12, and LSS22, and each of the clock main lines LSC11, LSC21, LSS11, and LSS21 and each of the clock connection lines LSC12, LSC22, LSS12, and LSS22 may be connected through a contact hole CT.

In addition, the scan clock line LSC and the sensing clock line LSS may be made of the same conductive material, but the present disclosure is not limited thereto.

In this embodiment, the first scan clock main line LSC11 and the second scan clock main line LSC21 may be disposed closer to each of the stages ST1, ST2, ST3, and ST4 than the first sensing clock main line LSS11 and the second sensing clock main line LSS21. When each of the stages ST1, ST2, ST3, and ST4 is provided at one side of the display panel, the first and second scan clock main lines LSC11 and LSC21 may be disposed closer to the display area ACTIVE AREA than the first and second sensing clock main lines LSS11 and LSS21.

Various loads may be generated in the scan clock line LSC and the sensing clock line LSS. For example, a resistance load and a capacitance load may be generated in the scan clock line LSC and the sensing clock line LSS. A delay time may be generated in each of the scan clock line LSC and the sensing clock line LSS according to the resistance load and the capacitance load, which are generated in the scan clock line LSC and the sensing clock line LSS. The delay time may be increased in proportion to a value of each load. When the delay time is increased, the pull-down times of the scan signals SSCAN_P and SSCAN_P+1 and the sensing signals SSENSE_P and SSENSE_P+1, which are described with reference to FIGS. 4A and 4B, may be increased. Therefore, the scan signals SSCAN_P and SSCAN_P+1 have a delay time shorter than that of the sensing signals SSENSE_P and SSENSE_P+1.

When the components of the scan clock lines LSC1 and LSC2 and the sensing clock lines LSS1 and LSS2 include the same material and are formed to have the same thickness, the resistance load may be in proportion to the length of each of the clock lines LSC and LSS, and be in inverse proportion to the width of each of the clock lines LSC and LSS. For example, when the length of any one clock line is lengthened (e.g., increased), the resistance load may be increased. When the width of any one clock line is widened (e.g., increased), the resistance load may be decreased.

In addition, the capacitance load may be generated in each of overlapping regions LD1, LD2, LD3, and LD4 of the clock lines LSC and LSS, and be in proportion to the area of each of the overlapping regions LD1, LD2, LD3, and LD4 of the clock lines LSC and LSS. For example, when the area of an overlapping region in any clock line is widened (e.g., increased), the capacitance load may be increased.

When the first and second scan clock main lines LSC11 and LSC21 are disposed closer to each of the stages ST1, ST2, ST3, ST4 than the first and second sensing clock main lines LSS11 and LSS21, a resistance load and a capacitance load, which are applied to the first and second scan clock lines LSC1 and LSC2, may be smaller than those applied to the first and second sensing clock line LSS1 and LSS2.

For example, in relation to the resistance load, when the first and second scan clock main lines LSC11 and LSC21 are disposed closer to the display area ACTIVE AREA than the first and second sensing clock main lines LSS11 and LSS21, the first and second scan clock connection lines LSC12 and LSC22 may be shorter than the first and second sensing clock connection lines LSS12 and LSS22. Because the resistance load is in proportion to the length of each of the clock lines LSS and LSC as described above, a resistance load applied to the scan clock line LSC in which the first and second scan clock connection lines LSC12 and LSC22 are formed shorter than the first and second sensing clock connection lines LSS12 and LSS22 may be smaller than that applied to the sensing clock line LSS.

Also, in relation to the capacitance load, the above-described capacitance load may be generated in each of overlapping regions LD1, LD2, LD3, and LD4 in which the main lines LSC11, LSC21, LSS11, and LSS21 and the connection lines LSC12, LSC22, LSS12, and LSS22 overlap with each other.

For example, the first scan clock line LSC1 may have a first capacitance load in a first overlapping region LD1 in which the first scan clock connection line LSC12 and the second clock main line LSC21 overlap with each other. The first sensing clock line LSS1 may have a second overlapping region LD2 including an overlapping region LD21 of the first sensing clock connection line LSS12 and the second sensing clock main line LSS21, an overlapping region LD22 of the first sensing clock connection line LSS12 and the first scan clock main line LSC11, and an overlapping region LD23 of the first sensing clock connection line LSS12 and the second scan clock main line LSC21. The sensing clock line LSS1 may have a second capacitance load in the second overlapping region LD2.

The first overlapping region LD1 of the first scan clock line LSC1 is formed to have an area greater than that of the second overlapping region LD2 of the first sensing clock line LSS1, and the capacitance load is in proportion to the area of each overlapping region as described above. Hence, the second capacitance load applied to the first sensing clock line LSS1 may be greater than the first capacitance load applied to the first scan clock line LSC1.

For example, when the first and second scan clock main lines LSC11 and LSC21 are disposed closer to the display area ACTIVE AREA than the first and second sensing clock main lines LSS11 and LSS21, a delay time occurring in the scan clock line LSC may be smaller than that occurring in the sensing clock line LSS, and the scan signals SSCAN_P and SSCAN_P+1 may be pulled down more rapidly than the sensing signals SSENSE_P and SSENSE_P+1.

Figure 6:
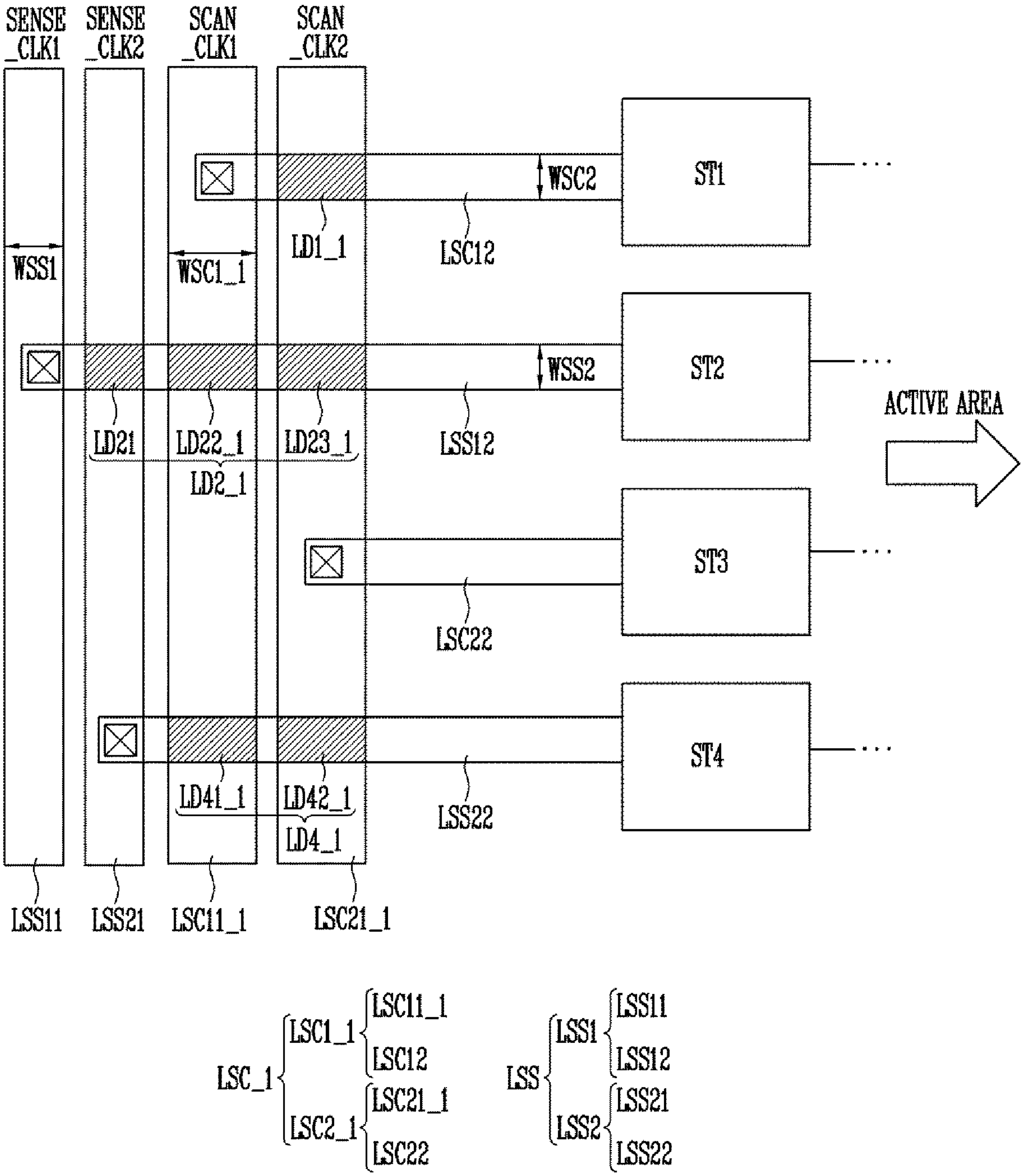
FIGS. 6-8 are views illustrating scan clock lines and sensing clock lines in accordance with various embodiments of the present disclosure.
Figure 7:
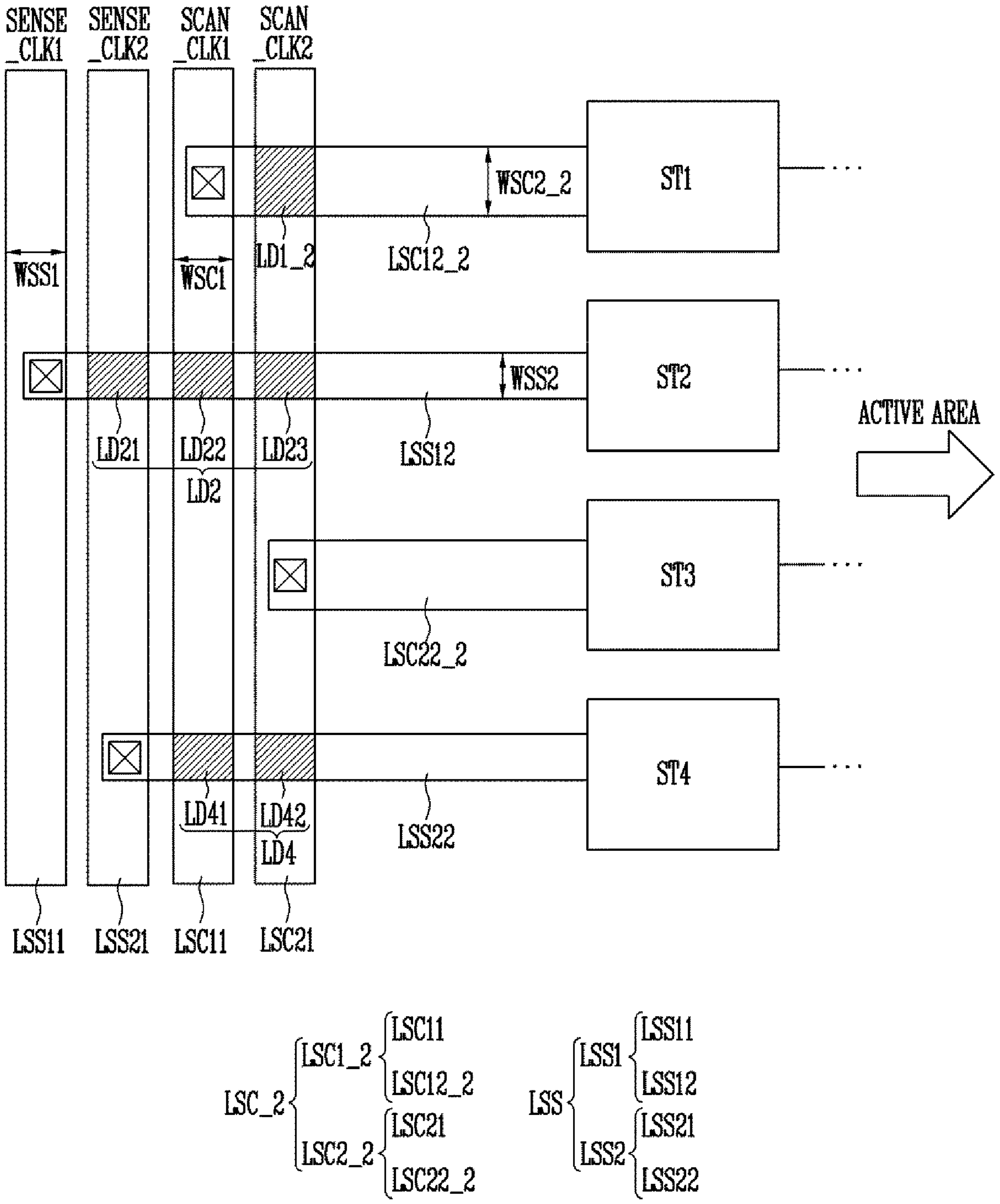
Figure 8:
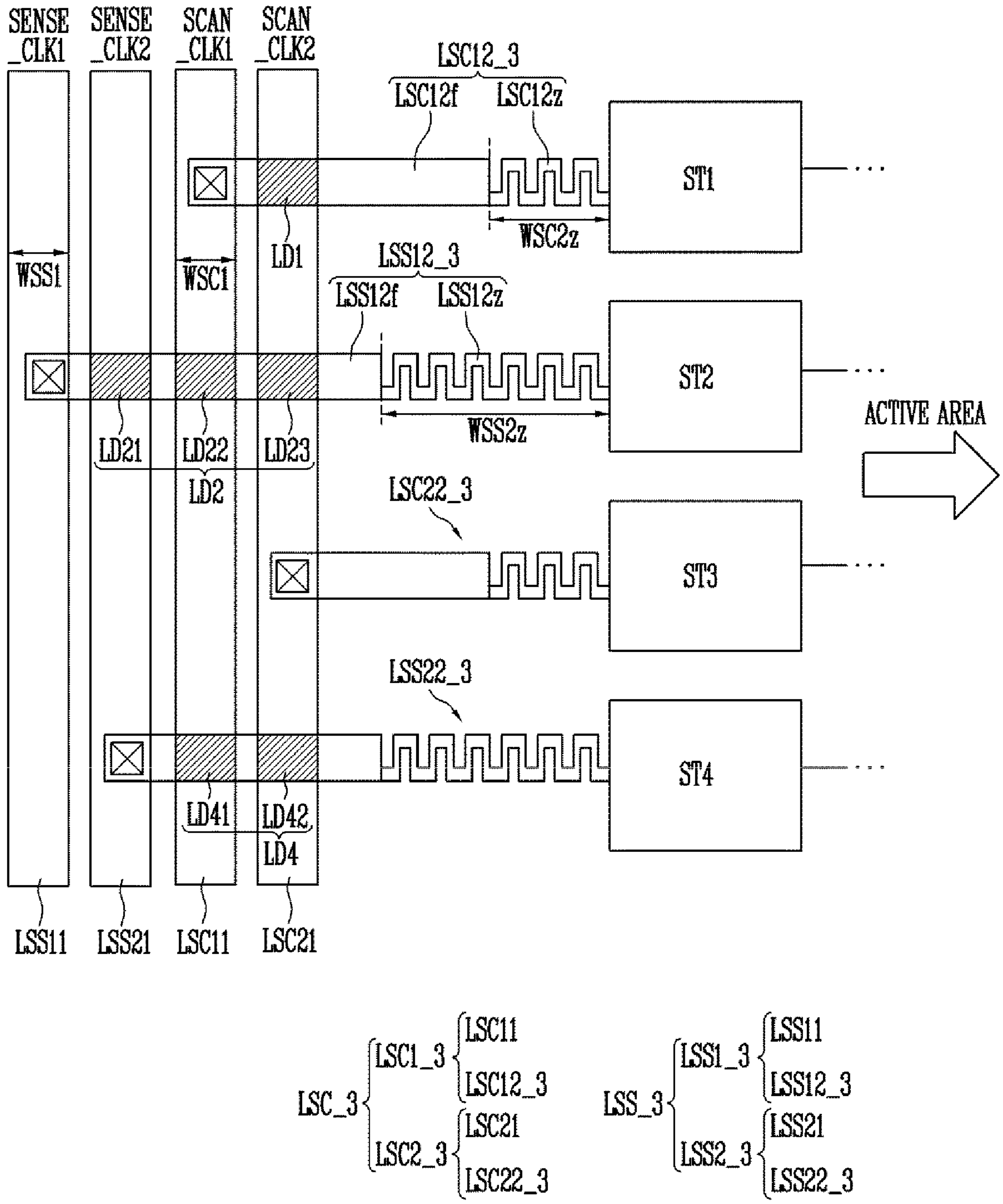

FIGS. 6-8 are views illustrating scan clock lines and sensing clock lines in accordance with various embodiments of the present disclosure. In the following embodiments, components identical to those of the above-described embodiment are designated by like reference numerals, and their descriptions may be omitted or simplified. In the following embodiments, differences from the above-described embodiment will be mainly described.

In addition, since the second scan clock line LSC2 and the second sensing clock line LSS2 are identical or similar to the first scan clock line LSC1 and the first sensing clock line LSS1, the first scan clock line LSC1 and the first sensing clock line LSS1 will be mainly described, and detailed descriptions of the second scan clock line LSC2 and the second sensing clock line LSS2 may be omitted.

The embodiment shown in FIG. 6 is different from the embodiment shown in FIG. 5 in that scan clock main lines LSC11_1 and LSC21_1 are formed to have a width WSC1_1 wider (e.g., greater) than a width WSS1 of the sensing clock main lines LSS11 and LSS21.

Referring to FIG. 6, the width WSC1_1 of first and second scan clock main lines LSC11_1 and LSC21_1 may be formed wider (e.g., greater) than the width WSS1 of the first and second sensing clock main lines LSS11 and LSS21.

When the width WSC1_1 of first and second scan clock main lines LSC11_1 and LSC21_1 is formed wider (e.g., greater) than the width WSS1 of first and second sensing clock main lines LSS11 and LSS21, a load applied to a scan clock line LSC_1 may be smaller than that applied to the sensing clock line LSS.

For example, in relation to the resistance load, the width WSC1_1 of first and second scan clock main lines LSC11_1 and LSC21_1 is formed wider (e.g., greater) than the width WSS1 of first and second sensing clock main lines LSS11 and LSS21, and the resistance load is in inverse proportion to the width of each of the clock lines LSC_1 and LSS as described above. Hence, the resistance load applied to a scan clock line LSC_1 may be smaller than that applied to the sensing clock line LSS.

In relation to the capacitance load, a first scan clock line LSC1_1 may have a first capacitance load in a first overlapping region LD1_1 in which the first scan clock connection line LSC12 and the second scan clock main line LSC21_1 overlap with each other. The first sensing clock line LSS1 may have a second overlapping region LD2_1 including an overlapping region LD21 of the first sensing clock connection line LSS12 and the second sensing clock main line LSS21, an overlapping region LD22_1 of the first sensing clock connection line LSS12 and the first scan clock main line LSS11_1, and an overlapping region LD23_1 of the first sensing clock connection line LSS12 and the second scan clock main line LSS21_1. The first sensing clock line LSS1 may have a second capacitance load in the second overlapping region LD2_1.

The second overlapping region LD2_1 of the first sensing clock line LSS1 is formed to have an area greater than that of the first overlapping region LD1_1 of the first scan clock line LSC1_1, and the capacitance load is in proportion to the area of each overlapping region as described above. Hence, the second capacitance load applied to the first sensing clock line LSS1 may be greater than the first capacitance load applied to the first scan clock line LSC1_1.

For example, when the first and second scan clock main lines LSC11_1 and LSC21_1 are formed to have a width wider (e.g., greater) than that of the first and second sensing clock main lines LSS11 and LSS21, a delay time occurring in the scan clock line LSC_1 may be smaller than that occurring in the sensing clock line LSS.

The embodiment shown in FIG. 7 is different from the embodiment shown in FIG. 5 in that a scan clock connection line is formed to have a width wider (e.g., greater) than that of a sensing clock connection line.

Referring to FIG. 7, first and second scan clock connection lines LSC12_2 and LSC22_2 may be formed to have a width WSC2_2 wider (e.g., greater) than a width WSS2 of the first and second sensing clock connection lines LSS12 and LSS22.

When the width WSC2_2 of the first and second scan clock connection lines LSC12_2 and LSC22_2 is formed wider (e.g., greater) than the width WSS2 of the first and second sensing clock connection lines LSS12 and LSS22, a load applied to a scan clock line LSC_2 may be smaller than that applied to the sensing clock line LSS.

For example, in relation to the resistance load, the width WSC2_2 of the first and second scan clock connection lines LSC12_2 and LSC22_2 is formed wider (e.g., greater) than the width WSS2 of the first and second sensing clock connection lines LSS12 and LSS22, and the resistance load is in inverse proportion to the width of each of the clock lines LSC_2 and LSS as described above. Hence, the resistance load applied to the scan clock line LSC_2 may be smaller than that applied to the sensing clock line LSS.

In relation to the capacitance load, a first scan clock line LSC1_2 may have a first capacitance load in a first overlapping region LD1_2 in which the first scan clock connection line LSC12_2 and the second scan clock main line LSC21 overlap with each other. The first sensing clock line LSS1 may have a second overlapping region LD2 including an overlapping region LD21 of the first sensing clock connection line LSS12 and the first sensing clock main line LSS21, an overlapping region LD22 of the first sensing clock connection line LSS12 and the first scan clock main line LSC11, and an overlapping region LD23 of the first sensing clock connection line LSS12 and a second scan clock main line LSC21. The first sensing clock line LSS1 may have a second capacitance load in the second overlapping region LD2.

The second overlapping region LD2 of the first sensing clock line LSS1 is formed to have an area greater than that of the first overlapping region LD1_2 of the first scan clock line LSC1_2, and the capacitance load is in proportion to the area of each overlapping region. Hence, the second capacitance load applied to the first sensing clock line LSS may be greater than the first capacitance load applied to the first scan clock line LSC1_2.

That is, when the first and second scan clock connection lines LSC12_2 and LSC22_2 are formed to have a width wider than that of the first and second sensing clock connection lines LSS12 and LSS22, a delay time occurring in the scan clock line LSC_2 may be smaller than that occurring in the sensing clock line LSS.

The embodiment shown in FIG. 8 is different from the embodiment shown in FIG. 5 in that clock connection lines LSC12_3, LSS12_3, LSC22_3, and LSS22_3 include bent parts (or bent portions) having different lengths.

Referring to FIG. 8, a first scan clock connection line LSC12_3 may include a first flat part (or a first flat portion) LSC12*f* and a first bent part (or a first bent portion) LSC12*z*, and a first sensing clock connection line LSS12_3 may include a second flat part (or a second bent portion) LSS12*f* and a second bent part (or a second bent portion) LSS12*z*.

Each of the bent parts LSC12*z* and LSS12*z* has a width narrower than that of each of the flat parts LSC12*f* and LSS12*f*, is formed in a zigzag shape, and has a relatively long total length. Also, each of the bent parts LSC12*z* and LSS12*z* may not overlap with the clock main lines LSS1, LSS21, LSC11, and LSC21. Therefore, each of the bent parts LSC12*z* and LSS12*z* may increase resistance loads of a scan clock line LSC_3 and a sensing clock line LSS_3, and the resistance loads may be increased in proportion to lengths WSC2*z* and WSS2*z* of the bent parts LSC12*z* and LSS12*z*.

The length WSC2*z* of the first bent part LSC12*z* may be different from that WSS2*z* of the second bent part LSS12*z*. In an embodiment, the length WSC2*z* of the first bent part LSC12*z* may be formed shorter (e.g., smaller) than the length WSS2*z* of the second bent part LSS12*z* such that a resistance load applied to a first scan clock line LSC1_3 is smaller than that applied to a first sensing clock line LSS_3.

Meanwhile, in another embodiment, unlike the embodiment shown in FIG. 8, the length WSC2*z* of the first bent part LSC12*z* may be formed longer (e.g., greater) than the length WSS2*z* of the second bent part LSS12*z* such that the resistance load applied to a first scan clock line LSC1_3 is increased. Accordingly, the resistance load applied to a first scan clock line LSC1_3 can be substantially equal to that applied to a first sensing clock line LSS_3.

In this embodiment, when the length WSC2*z* of the first bent part LSC12*z* is formed shorter (e.g., smaller) than the length WSS2*z* of the second bent part LSS12*z*, the resistance load applied to a first scan clock line LSC1_3 may be greater than that applied to a first sensing clock line LSS_3.

That is, when the length WSC2*z* of the first bent part LSC12*z* of the first scan clock connection line LSC12_3 is formed shorter (e.g., smaller) than the length WSS2*z* of the second bent part LSS12*z* of the first sensing clock connection line LSS12_3, a delay time occurring in the scan clock line LSC_3 may be smaller than that occurring in the sensing clock line LSS_3.

Figure 9:
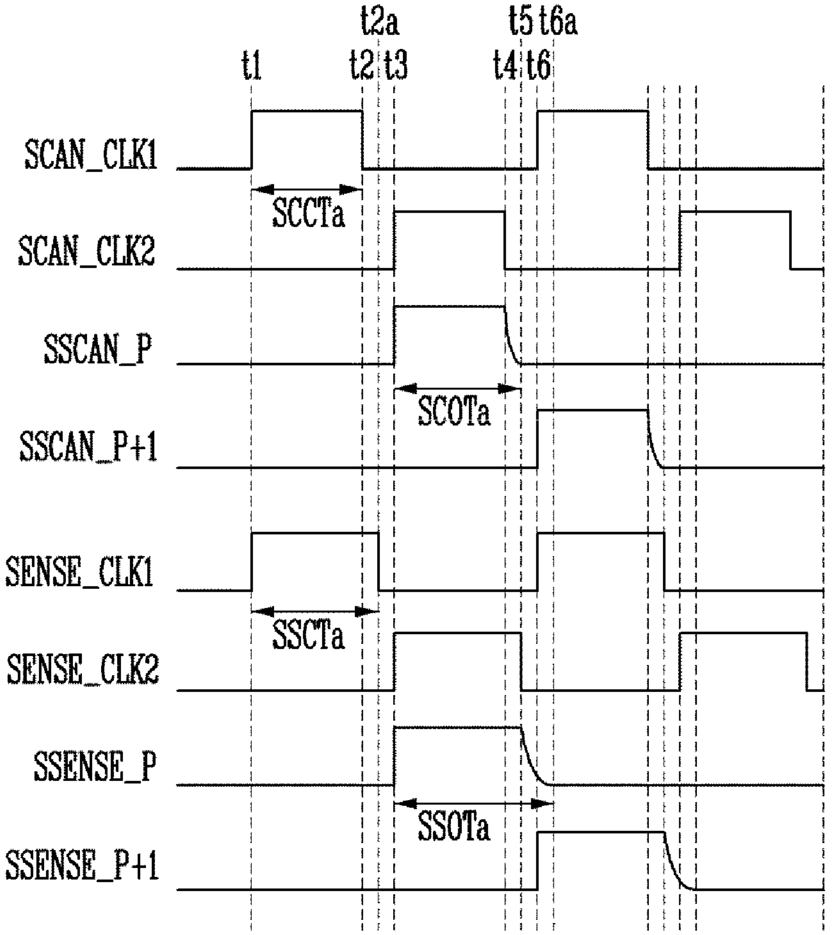
FIG. 9 is a timing diagram illustrating an operation of the gate driver in another embodiment of the present disclosure.

FIG. 9 is a timing diagram illustrating an operation of the gate driver in another embodiment of the present disclosure. The embodiment shown in FIG. 9 is different from the embodiment shown in FIGS. 4A and 4B in that the sensing clock pulse has a width wider (e.g., greater) than that of the scan clock pulse.

Referring to FIG. 9, the first scan clock signal SCAN_CLK1 and the first sensing clock signal SENSE_CLK1 may be changed from the turn-off voltage level to the turn-on voltage level at a first time t1.

The first scan clock signal SCAN_CLK1 may be changed from the turn-on voltage level to the turn-off voltage level at a second time t2. That is, between the first time t1 and the second time t2, the first scan clock signal SCAN_CLK1 may have a scan clock pulse SCCTa of the turn-on voltage level.

The first sensing clock signal SENSE_CLK1 may be changed from the turn-on voltage level to the turn-off voltage level at a 2ath time t2*a* later than the second time t2. That is, between the first time t1 and the 2ath time t2*a*, the first sensing clock signal SENSE_CLK1 may have a sensing clock pulse SSCTa of the turn-on voltage level.

The scan clock pulse SCCTa may have a width narrower (e.g., smaller) than the sensing clock pulse SSCTa. That is, the first sensing clock signal SENSE_CLK1 may maintain the turn-on voltage level for a time longer than that of the first scan clock signal SCAN_CLK1.

At a third time t3, the first scan signal SSCAN_P and the first sensing signal SSENSE_P may be changed from the turn-off voltage level to the turn-on voltage level. The first scan signal SSCAN_P may have a scan pulse SCOTa of the turn-on voltage level according to the scan clock pulse SCCTa of the first scan clock signal SCAN_CLK1, and the first sensing signal SSENSE_P may have a sensing pulse SSOTa of the turn-on voltage level according to the sensing clock pulse SSCTa of the first sensing clock signal SENSE_CLK1.

The first scan signal SSCAN_P may be changed from the turn-on voltage level to the turn-off voltage level from a fourth time t4. For example, the first scan signal SSCAN_P may be pulled down from the fourth time t4 to a fifth time t5.

The first sensing signal SSENSE_P may be changed from the turn-on voltage level to the turn-off voltage level from the fifth time t5. For example, the first sensing signal SSENSE_P may be pulled down from the fifth time t5 to a 6ath time t6*a*.

That is, the first scan signal SSCAN_P may be changed to the turn-off voltage level at the fifth time t5, and the first sensing signal SSENSE_P may be changed to the turn-off voltage level at the 6ath time t6*a*.

As described above, the sensing clock pulse SSCTa has a width wider (e.g., greater) than that of the scan clock pulse SCCTa, and the first sensing clock signal SENSE_CLK1 maintains the turn-on voltage level for a time longer than that of the first scan clock signal SCAN_CLK1. Thus, the sensing pulse SSOTa of the first sensing signal SSENSE_P can maintain the turn-on voltage level for a time longer than that of the scan pulse SCOTa of the first scan signal SSCAN_P. That is, the first scan signal SSCAN_P can be changed to the turn-off voltage level more rapidly than the first sensing signal SSENSE_P.

Accordingly, in the first scan clock signal SCAN_CLK1, when the width of the scan clock pulse SCCTa is narrower (e.g., smaller) than that of the sensing clock pulse SSCTa, the first scan signal SSCAN_P is changed to the turn-off voltage level more rapidly than the first sensing signal SSENSE_P, so that the same effect as the above-described embodiments can be obtained.

In the gate driver and the display device including the same in accordance with embodiments of the present disclosure, the output of a scan signal is pulled down more rapidly than that of a sensing signal, so that a variation in voltage stored in the storage capacitor can be minimally maintained or reduced.

Further, in the gate driver and the display device including the same in accordance with embodiments of the present disclosure, the output of a scan signal can be pulled down more rapidly than that of a sensing signal even when a process deviation occurs.

Example embodiments have been disclosed herein, and although specific terms are employed, they are used and are to be interpreted in a generic and descriptive sense only and not for purpose of limitation. In some instances, as would be apparent to one of ordinary skill in the art as of the effective filing date of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their equivalents.

What is claimed is:

1. A display device comprising:

pixels connected to a first scan line to receive a first scan signal and a first sensing line to receive a first sensing signal;

a first scan clock line to receive a first scan clock signal for generating the first scan signal, wherein the first scan clock line comprises a first scan clock main line extending in one direction and a first scan clock connection line;

a first sensing clock line to receive a first sensing clock signal for generating the first sensing signal, wherein the first sensing clock line comprises a first sensing clock main line extending in one direction and a first sensing clock connection line; and a gate driver configured to provide the first scan signal to the pixels, wherein the first scan clock connection line has a width greater than that of the first sensing clock connection line.

2. The display device of claim 1, wherein the first scan clock connection line has a capacitance value smaller than that of the first sensing clock connection line, and the first scan clock line has a capacitance value smaller than that of the first sensing clock line.

3. The display device of claim 1, wherein the first scan clock connection line has a resistance value smaller than that of the first sensing clock connection line, and the first scan clock line has a resistance value smaller than that of the first sensing clock line.

4. The display device of claim 1, further comprising:

a first sensing driver configured to provide the first sensing signal to the pixels, wherein the gate driver comprises a first scan driver configured to provide the first scan signal to the pixels, wherein the first scan clock main line is at one side of the first scan driver, and the first scan clock connection line is connected to the first scan clock main line and the first scan driver, wherein the first sensing clock main line is at one side of the first sensing driver, and the first sensing clock connection line is connected to the first sensing clock main line and the first sensing driver, and wherein the first sensing clock connection line comprises a first overlapping region in which at least a portion of the first sensing clock connection line overlaps with the first scan clock main line.

5. The display device of claim 4, wherein the first scan clock main line has a width greater than that of the first sensing clock main line.

6. The display device of claim 5, wherein the first scan clock main line has a resistance value smaller than that of the first sensing clock main line, and the first scan clock line has a resistance value smaller than that of the first sensing clock line.

7. The display device of claim 4, wherein the first scan clock connection line comprises:

a first flat portion connected to the first scan clock main line; and a first bent portion connected to the first flat portion and the first scan driver, wherein the first bent portion has a width smaller than that of the first flat portion, and has a zigzag shape.

8. The display device of claim 7, wherein the first sensing clock connection line comprises:

a second flat portion connected to the first sensing clock main line; and a second bent portion connected to the second flat portion and the first sensing driver, wherein the second bent portion has a width smaller than that of the second flat portion, and has a zigzag shape.

9. The display device of claim 8, wherein the first bent portion has a length smaller than that of the second bent portion, and the first scan clock connection line has a resistance value smaller than that of the first sensing clock connection line.

10. The display device of claim 8, wherein the first bent portion has a length greater than that of the second bent portion, and the first scan clock connection line has a resistance value substantially equal to that of the first sensing clock connection line.

11. The display device of claim 4, further comprising:

a second scan driver configured to output a second scan signal in response to a second scan clock signal;

a second sensing driver configured to output a second sensing signal in response to a second sensing clock signal;

a second scan clock line configured to transfer the second scan clock signal to the second scan driver; and a second sensing clock line configured to transfer the second sensing clock signal to the second sensing driver, wherein the second scan clock line comprises a second scan clock main line extending along one direction and a second scan clock connection line connected to the second scan clock main line and the second scan driver, wherein the second sensing clock line comprises a second sensing clock main line extending along one direction and a second sensing clock connection line connected to the second sensing clock main line and the second sensing driver, and wherein the second sensing clock connection line comprises a second overlapping region in which at least a portion of the second sensing clock connection line overlaps with the first scan clock main line and a third overlapping region in which at least a portion of the second sensing clock connection line overlaps with the second scan clock main line.

12. The display device of claim 11, wherein the first sensing clock connection line comprises a fourth overlapping region in which at least a portion of the first sensing clock connection line overlaps with the second sensing clock main line.

13. A display device comprising:

a plurality of pixels;

a scan driver configured to output a scan signal in response to a scan clock signal;

a sensing driver configured to output a sensing signal in response to a sensing clock signal;

a scan clock line configured to transfer the scan clock signal to the scan driver; and a sensing clock line configured to transfer the sensing clock signal to the sensing driver, wherein the scan clock line comprises a scan clock main line extending along one direction and a scan clock connection line connected to the scan clock main line and the scan driver, wherein the sensing clock line comprises a sensing clock main line extending along one direction and a sensing clock connection line connected to the sensing clock main line and the sensing driver, and wherein the scan clock connection line has a width greater than that of the sensing clock connection line.

14. The display device of claim 13, further comprising a timing controller configured to generate the scan clock signal, the sensing clock signal, and first image data and a data driver configured to generate a data signal, based on the first image data, wherein the pixels emit light with a luminance corresponding to the data signal.

15. The display device of claim 13, wherein the scan signal comprises a scan pulse, and the scan pulse comprises a first scan pulse configured to maintain a turn-on voltage level, and a second scan pulse that is changed from the turn-on voltage level to a turn-off voltage level, and wherein the sensing signal comprises a sensing pulse, and the sensing pulse comprises a first sensing pulse that maintains the turn-on voltage level, and a second sensing pulse that is changed from the turn-on voltage level to the turn-off voltage level.

16. The display device of claim 15, wherein the scan pulse has a width smaller than that of the sensing pulse, and the scan signal is changed to the turn-off voltage level more rapidly than the sensing signal.

17. The display device of claim 16, wherein the first scan pulse has a width substantially equal to that of the first sensing pulse, and the second scan pulse has a width smaller than that of the second sensing pulse.

18. The display device of claim 15, wherein the scan clock signal comprises a scan clock pulse, and the sensing clock signal comprises a sensing clock pulse, and wherein the scan clock pulse has a width smaller than that of the sensing clock pulse.

19. The display device of claim 18, wherein the scan pulse has a width smaller than that of the sensing pulse, and the scan signal is changed to the turn-off voltage level more rapidly than the sensing signal.

* * * * *